(12) United States Patent
Oroskar et al.

(10) Patent No.: US 9,088,934 B1
(45) Date of Patent: Jul. 21, 2015

(54) MANAGEMENT OF ACCESS PROBE TRANSMISSION FROM A WIRELESS COMMUNICATION DEVICE

(71) Applicant: Sprint Spectrum L.P., Overland Park, KS (US)

(72) Inventors: Siddharth S. Oroskar, Overland Park, KS (US); Ryan P. Dreiling, Lenexa, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 152 days.

(21) Appl. No.: 13/849,996

(22) Filed: Mar. 25, 2013

(51) Int. Cl.
*H04W 4/00* (2009.01)
*H04W 48/16* (2009.01)

(52) U.S. Cl.
CPC ...................... *H04W 48/16* (2013.01)

(58) Field of Classification Search
USPC ................. 370/331–332, 336–338; 455/67.11–67.13, 63.1, 41.2, 456.1, 455/436, 434
See application file for complete search history.

(56) References Cited

U.S. PATENT DOCUMENTS

| | | | |
|---|---|---|---|
| 5,491,837 A * | 2/1996 | Haartsen .......................... | 455/62 |
| 7,171,165 B2 | 1/2007 | Azman et al. | |
| 7,636,322 B1 | 12/2009 | Gandhi et al. | |
| 2001/0043578 A1 * | 11/2001 | Kumar et al. ................... | 370/331 |
| 2002/0198000 A1 * | 12/2002 | Voyer .............................. | 455/453 |
| 2005/0020213 A1 * | 1/2005 | Azman et al. ................ | 455/67.11 |
| 2005/0176427 A1 * | 8/2005 | Roberts ........................... | 455/434 |
| 2006/0135066 A1 * | 6/2006 | Banerjea ........................ | 455/41.2 |
| 2006/0221885 A1 * | 10/2006 | Nagaraj ........................ | 370/328 |
| 2009/0280828 A1 * | 11/2009 | Wang et al. ................. | 455/456.1 |
| 2010/0189165 A1 * | 7/2010 | Xu et al. ......................... | 375/219 |
| 2010/0322198 A1 * | 12/2010 | Friday et al. .................. | 370/332 |
| 2011/0051697 A1 * | 3/2011 | Wang et al. .................... | 370/336 |
| 2011/0130143 A1 * | 6/2011 | Mori et al. ..................... | 455/436 |

OTHER PUBLICATIONS

U.S. Appl. No. 13/031,506, filed Feb. 21, 2011.
Samuel Yang, "CDMA RF System Engineering," pp. 85-94, 113, and 141-145, 1998.

* cited by examiner

*Primary Examiner* — Nathan Taylor

(57) ABSTRACT

Disclosed is a method and corresponding apparatus for management of access probe transmission from a wireless communication device (WCD) to a radio access network (RAN). The WCD determines that a particular coverage area is not the strongest coverage area detected by the WCD, and the WCD responsively transmits an access probe to the RAN in that particular coverage area. For instance, the WCD may define a sequence of access probe transmissions including at least one transmission to just a coverage area that the WCD deems to not be the strongest and further including at least one transmission to just a coverage area that the WCD deems to be the strongest.

10 Claims, 4 Drawing Sheets

MANAGEMENT OF ACCESS PROBE TRANSMISSION FROM A WIRELESS COMMUNICATION DEVICE

BACKGROUND

Unless otherwise indicated herein, the materials described in this section are not prior art to the claims and are not admitted to be prior art by inclusion in this section.

A cellular wireless network may include a number of base stations that radiate to define wireless coverage areas, such as cells and cell sectors, in which wireless communication devices (WCDs) such as cell phones, tablet computers, tracking devices, embedded wireless modules, and other wirelessly equipped communication devices, can operate. In turn, each base station may be coupled with network infrastructure that provides connectivity with one or more transport networks, such as the public switched telephone network (PSTN) and/or the Internet for instance. With this arrangement, a WCD within coverage of the network may engage in air interface communication with a base station and may thereby communicate via the base station with various remote network entities or with other WCDs served by the base station.

Such a cellular wireless network may operate in accordance with a particular air interface protocol or "radio access technology," with communications from the base stations to WCDs defining a downlink or forward link and communications from the WCDs to the base stations defining an uplink or reverse link. Examples of existing air interface protocols include, without limitation, Code Division Multiple Access (CDMA) (e.g., 1xRTT and 1xEV-DO), Long Term Evolution (LTE), WiMAX, iDEN, TDMA, AMPS, GSM, GPRS, UMTS, EDGE, MMDS, WIFI, and BLUETOOTH. Each protocol may define its own procedures for registration of WCDs, initiation of communications, handoff between coverage areas, and functions related to air interface communication.

In accordance with the air interface protocol, each coverage area may operate on one or more carrier frequencies and may define a number of air interface channels for carrying information between the base station and WCDs. These channels may be defined in various ways, such as through frequency division multiplexing, time division multiplexing, and/or code-division multiplexing for instance.

By way of example, each coverage area may define a pilot channel, reference channel or other resource on which the base station may broadcast a pilot signal, reference signal, or the like that WCDs may detect as an indication of coverage and may measure to evaluate coverage strength. As another example, each coverage area may define one or more uplink control channels or other resources on which WCDs may transmit control messages to the base station. And each coverage area may define one or more downlink control channels or other resources on which the base station may transmit control messages to WCDs. Each coverage area may then define one or more traffic channels or other resource for carrying communication traffic such as voice data and other data between the base station and WCDs.

When a WCD first powers on or enters into coverage of the network, the WCD may scan for and identify a strongest pilot or reference signal (e.g., having the highest signal-to-noise ratio) and may register with the network by transmitting a registration request or attach request to a base station providing that signal. This registration process may serve to notify the network of the WCD's presence in a particular coverage area and to facilitate network authentication of the WCD.

Once registered, the WCD may then operate in an idle mode (i.e., the WCD may idle in the selected coverage area) in which the WCD monitors a downlink control channel to receive overhead information and to check for any page messages. In the idle mode, the WCD may have no assigned traffic channel resources on which to engage in bearer communication.

Further, when the WCD is operating in the idle mode, the WCD may continue to regularly scan pilot or reference signals, from both the coverage area in which the WCD is idling and any other coverage areas that extend to the WCD's location. Through this process, if the WCD thereby detects that another coverage area is stronger than the coverage area in which the WCD is idling, the WCD may then transition to idle in that other coverage area instead, i.e., the WCD may engage in idle handoff to the other coverage area. In addition, depending on the circumstances, the WCD may also then re-register with the network, to notify the network of the WCD's presence in the new coverage area.

When the network has a communication (such as a voice call or other traffic) to provide to a WCD that is registered with the network but is operating in the idle mode, the network may page the WCD in an effort to then facilitate assigning traffic channel resources to the WCD. In particular, the network may transmit a page message to the WCD on a downlink paging channel. Assuming the WCD receives this page message, the WCD may then transmit a page response message to the network on an uplink access channel. And upon receipt of the page response message, the network may then assign traffic channel resources to the WCD, for use to carry the communication, thus transitioning the WCD to a connected or active mode in which the WCD can engage in the communication.

Likewise, when an idle WCD seeks to initiate a communication (such as to place a voice call or engage in other bearer communication), the WCD may transmit on an uplink access channel to the base station a connection request (e.g., origination request), and the network may then assign traffic channel resources to the WCD for use to carry the communication, similarly transitioning the WCD to a connected or active mode in which the WCD can engage in the communication.

Overview

When a WCD is idling in a coverage area of a cellular wireless network and the WCD seeks to transmit a control message such as an connection request or a page response message to the network, the WCD may normally transmit the control message to the network on an uplink access channel in that coverage area. Given that the WCD idles in the strongest coverage area that the WCD has detected, this means that the WCD would transmit such a control message to the network in the strongest coverage area that the WCD has detected.

Furthermore, when a WCD seeks to transmit a control message to the network, the WCD may normally engage in a defined sequence of access probe transmissions until the WCD receives an acknowledgement from the network. In accordance with network settings, for instance, the defined sequence may be a particular number of transmissions, such as three, six, or nine transmissions, with each subsequent transmission being made at an increased power level in an effort to ensure receipt by the network. The WCD would continue transmissions of this sequence until completing the sequence. However, if the WCD receives an acknowledgement from the network, however, such as a downlink message indicating that the network received the WCD's transmission, the WCD would then discontinue further transmissions of the sequence.

By way of example, when a WCD seeks to transmit a connection request to the network, the WCD may generate and transmit to the network an access probe carrying the connection request and may then wait a time period to receive an acknowledgement message from the network. If the WCD does not receive an acknowledgement within that time period, the WCD may then generate and transmit to the network at an increased power level another access probe carrying the connection request, and so forth, repeating this process until the WCD completes the defined sequence of transmissions or the WCD receives an acknowledgement from the network.

During the course of engaging in such a sequence of access probe transmissions to the network, if the WCD detects that another coverage area is stronger than the coverage area in which the WCD is idling, the WCD may transition to transmit a next access probe of the sequence in that other coverage area or may transition to re-start the sequence of access probe transmissions in that other coverage area. Through this process, the WCD would thereby continue to transmit each access probe of the sequence in the strongest coverage area that the WCD has detected, although which coverage area the WCD detects as the strongest may change over time.

Unfortunately, however, a potential problem with this process is that issues out of the WCD's control may prevent these access probe transmissions from successfully arriving at or being processed by the network even though the WCD provides each transmission in the strongest coverage area that the WCD has detected. For example, a high level of uplink air interface noise or congestion may prevent the base station serving that coverage area from receiving the transmissions. And as another example, operational issues at the base station or associated equipment may prevent successful transmission of an acknowledgement from the base station to the WCD.

Disclosed herein is a method and corresponding apparatus to help increase the chances of successful access probe transmission from a WCD to a network (or successful acknowledgement from the network). In accordance with the method, the WCD will transmit at least one access probe to the network in a coverage area that the WCD determines is not the strongest coverage area. In practice, for instance, when the WCD is going to engage in a sequence of access probe transmissions to the network, the WCD may define the sequence to include a number of transmissions to the coverage area that the WCD has determined is strongest but to also include a number of transmissions to a coverage area that the WCD has determined is not strongest, such as to a coverage area that the WCD has determined is second-strongest for example.

By intentionally providing an access probe transmission to the network in a coverage area that the WCD has determined to not be the strongest, the WCD may help to increase chances of success. This is particularly the case where the WCD attempts access probe transmission in the strongest coverage area but that effort fails. In that scenario, as noted above, an issue with that strongest coverage area may be preventing success. But there is a chance that another coverage area that is not the strongest detected by the WCD may not have such an issue, and access probe transmission in that other coverage area may therefore succeed. Thus, the WCD may increase its chances of success by providing at least one access probe transmission in that other coverage area, even though that other coverage area is not the strongest detected by the WCD, and indeed in response to that other coverage area not being the strongest detected by the WCD.

Accordingly, disclosed herein is a method that includes a WCD operating within coverage of a radio access network (RAN), where the RAN radiates to define a plurality of wireless coverage areas each having a respective pilot signal (i.e., pilot signal, reference signal, or the like). In practice, the WCD may then monitor the pilot signals and, based on the monitoring, determine that a particular one of the wireless coverage areas is not a strongest coverage area detected by the WCD. And in response to that determination, the WCD may then transmit an access probe to the RAN in just that particular coverage area.

By way of example, the WCD may monitor the pilot signals and, based on the monitoring, determine that a first one of the wireless coverage areas is a strongest wireless coverage area detected by the WCD and a second one of the wireless coverage areas is not the strongest wireless coverage area detected by the WCD. And the WCD may engage in a sequence of access probe transmissions to the RAN until the WCD completes the sequence or until the WCD receives an acknowledgement from the RAN, and each access probe transmission of the sequence may be to just a single wireless coverage area of the RAN. Further, (i) in response to determining that the first coverage area is the strongest wireless coverage area detected by the WCD, the WCD may define the sequence to include at least one access probe transmission to the first wireless coverage area of the RAN, and (ii) in response to determining that the second wireless coverage area is not the strongest wireless coverage area detected by the WCD, the WCD may further define the sequence to include at least one access probe transmission to the second wireless coverage area of the RAN.

In addition, disclosed herein is a WCD that includes a wireless communication interface configured to engage in wireless communication with a RAN, where the RAN radiates to define a plurality of wireless coverage areas each having a respective pilot signal. The disclosed WCD may include a control unit (possibly integrated with the wireless communication interface) that is configured (i) to monitor the pilot signals and, based on the monitoring, make a determination that a particular one of the coverage areas is not a strongest coverage area detected by the WCD and (ii) to define a sequence of access probe transmissions based on the monitoring, including in the sequence at least one access probe transmission to just the particular coverage area in response to the determination being that particular coverage area is not the strongest coverage area detected by the WCD. The wireless communication interface may then further be configured to transmit access probes to the RAN in accordance with the defined sequence.

These as well as other aspects, advantages, and alternatives will become apparent to those of ordinary skill in the art by reading the following detailed description, with reference where appropriate to the accompanying drawings.

DETAILED DESCRIPTION

Figure 1:
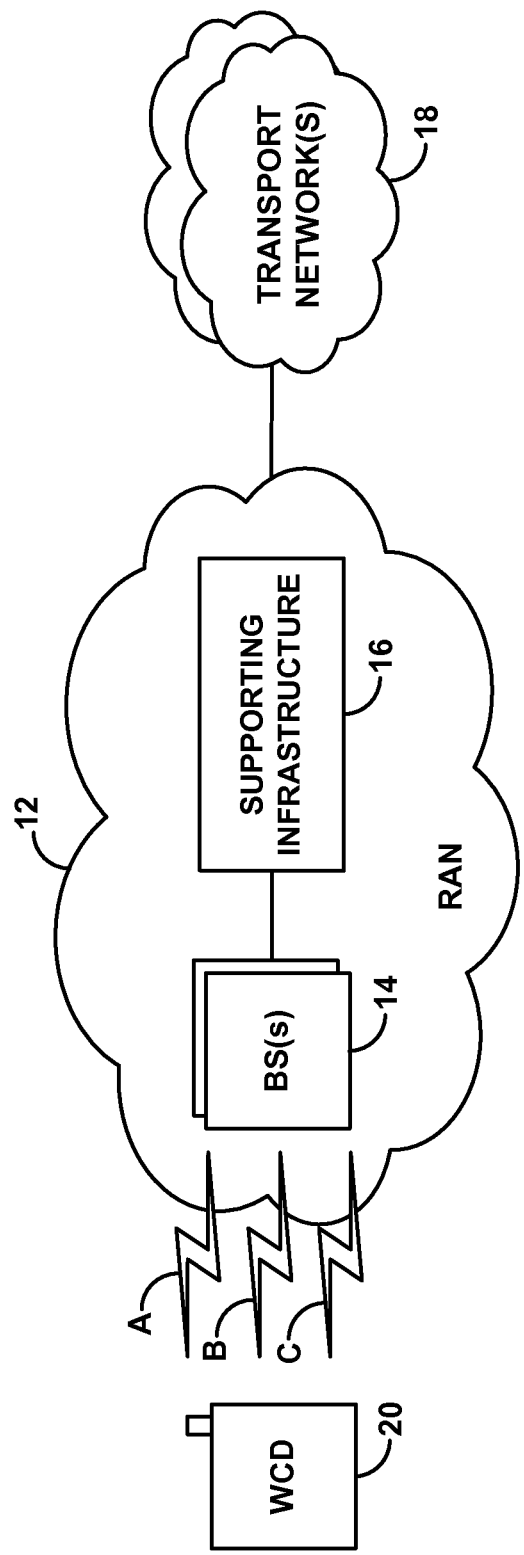
FIG. 1 is a simplified block diagram of a network arrangement in which an exemplary embodiment of the present method and apparatus can be implemented.

As a general matter, the present method can be implemented in the context of any arrangement where a WCD would transmit a sequence of access probes to a RAN and where the WCD is situated within at least two coverage areas of the RAN, so that the WCD can evaluate strength of those coverage areas and determine that a particular coverage area is not the strongest. As such, the following description and associated figures serve merely as examples, and it will be understood that numerous variations are possible. For instance, network arrangement, WCD configuration, and method functions may vary, with elements being added, removed, combined, distributed, reordered, or otherwise modified. Further, those skilled in the art will appreciate that various as functions disclosed herein may be implemented by a computer or other machine using any combination of software, firmware, and/or hardware.

Referring to the drawings, as noted above, FIG. 1 is a simplified block diagram of an example communication system in which the present method can be implemented. As shown, the example system includes at its core a RAN 12 having one or more base stations 14 that radiate to define a number of coverage areas, three examples of which are shown as coverage areas A, B, and C. Further, the RAN then includes supporting infrastructure 16, such as a base station controller, radio network controller, mobility management entity, mobile switching center, and/or gateway, which may function to control aspects of base station operation and to connectivity with one or more transport networks 18 such as the PSTN and/or the Internet.

Coverage areas A, B, and C may emanate from the same base station or different base stations and may take various forms. As one example, for instance, each coverage area may be a cell sector provided by a separate base station. Further, each coverage area may define an air interface in accordance with an air interface protocol such as one of those noted above. As such, each coverage area may operate on one or more carrier frequencies and may define various downlink and uplink channels including a downlink pilot channel and an uplink access channel. The downlink pilot channel may be a broadcast channel on which the base station transmits a pilot signal that identifies the coverage area and that WCDs may monitor as a basis to determine strength of the coverage area. And the uplink access channel may be a random access channel having timeslots or the like in which WCDs can transmit access probes to the RAN. Further, the air interface may define various other channels, such as additional control channels and traffic channels for instance.

As a specific example of this arrangement, in a system operating according to the CDMA protocol, communications in each coverage area may be distinguished from those in adjacent coverage areas by modulation using a "PN offset" specific to the coverage area. Further, each channel in a CDMA coverage area may be distinguished by additional modulation using one or more other spreading codes. Applying a CDMA receiver, a WCD may thus detect presence of a particular CDMA coverage area and receive downlink communications from the RAN in that coverage area by scanning for and detecting downlink signals using the coverage area's PN offset. Further, the WCD may communicate to the RAN in that coverage area by transmitting communications modulated with the coverage area's PN offset.

Likewise, in a system operating according to the LTE protocol, each coverage area may be distinguished from adjacent coverage areas by a PN offset and further by physical cell identity (PCI) broadcast by the serving base station. Further, channels in an LTE coverage area may be defined by through multiplexing over time and frequency, with particular information exchanged in defined frames, resource blocks, and resource elements. Other examples are possible as well.

FIG. 1 further illustrates a representative WCD 20 that is positioned within coverage of at least two of the illustrated coverage areas. The WCD may be any device that is equipped to engage in wireless communication with the RAN and to carry out various WCD functions described herein. By way of example, the WCD may be a cell phone, or wirelessly-equipped tablet, computer, tracking device, appliance, embedded wireless module, or other wirelessly-equipped device of a type now known or later developed.

In operation, as discussed above, the WCD may regularly scan for and detect the presence of various coverage areas and may determine (e.g., measure or compute) the strength of each detected coverage area. For instance, the WCD may apply a radio receiver that scans for pilot signals in various frequency bands and on various PN offsets or the like, that determines based on each such detected signal the identity of the coverage area providing the signal, and that measures the strength of each such signal as a representation of strength of the identified area. In practice, the WCD may determine the strength of a pilot as a receive signal strength or as a signal-to-noise ratio (such as $E_c/I_o$, i.e., energy per chip to overall spectral noise, for instance).

In the arrangement shown, for example, the WCD might scan for and detect coverage areas A, B, and C and might evaluate the signal strength of each of those coverage areas. Through that evaluation, the WCD may thereby determine that coverage area A is the strongest, coverage area B is the second strongest, and coverage area C is the third strongest. (For instance, the WCD might determine that the pilot signal of coverage area A is of strength −4 dBm, the pilot signal of coverage area B is of strength −7 dBm, and the pilot signal of coverage area C is −10 dBm.) In other words, the WCD may thereby determine that coverage area A is the strongest, coverage area B is not the strongest, and coverage area C is also not the strongest.

In accordance with the present method as discussed above, when the WCD is going to transmit an access probe to the RAN, the WCD may be configured to transmit the access probe in a particular coverage area in response to the WCD determining that that particular coverage area is not the strongest one detected by the WCD. Thus, in the arrangement described above, for instance, where the WCD has determined that coverage area B is not the strongest, the WCD may responsively transmit an access probe to the RAN in coverage area B. Doing this runs contrary to the procedure in which the WCD would transmit access probes to the RAN in just the coverage area that the WCD determines is strongest, but may help increase the chances of success.

In practice, for instance, when the WCD seeks to transmit a connection request or page response message to the RAN, the WCD may engage in a sequence of access probe transmissions to the RAN until the WCD completes the sequence or the WCD receives an acknowledgement from the RAN, and the WCD may programmatically define that sequence to include at least one access probe transmission to a coverage area that the WCD deems to be not the strongest.

Basic characteristics of such an access probe sequence, such as length of the sequence and power increments for each subsequent transmission, may be dictated by an overhead system information message broadcast by the RAN (and received and read by the WCD) and/or by control logic in the WCD. For instance, a system parameters message broadcast by the RAN may indicate that each access probe transmission sequence should be three transmissions with particular power increase for each subsequent transmission. Further, a WCD may be programmed to repeat such a sequence after experiencing overall failure, in which case the sequence could be considered to be that defined by the RAN or the combination of that defined by the RAN and the repetition defined by the WCD. Other examples are possible as well.

The WCD may then further define the sequence in terms of the coverage areas to which (i.e., in which) the WCD will send access probes of the sequence, so that the WCD will provide at least one such access probe transmission in a coverage area that the WCD deems to be not the strongest and optimally also to provide at least one such access probe transmission in a coverage area that the WCD deems to be the strongest. For instance, the WCD may define the sequence to begin with one or more access probe transmissions to the coverage area that the WCD deems to be the strongest and to then include one or more access probe transmissions to a coverage area that the WCD deems to not be the strongest.

In so defining the sequence, the WCD may limit the sequence to include transmissions to just certain coverage areas that the RAN indicates may support an access probe handoff process. This may be relevant in a scenario where the WCD's access probe transmission to the RAN is a response to a page message transmitted by the RAN, as the RAN may need to be prepared to receive such a response in a coverage area other than that in which the RAN transmitted the page message to the WCD. In practice, the RAN may broadcast to the WCD a list of coverage areas supporting access probe handoff, and the WCD may receive and read that list and limit the access probe sequence to include just coverage areas on that list, to the extent such coverage areas meet the strength conditions described herein and any other criteria as may be defined by the RAN or WCD.

Further, the WCD may define the sequence before the WCD begins any transmissions of the sequence. Alternatively or additionally, the WCD may define the sequence as the WCD proceeds with the transmissions. For instance, the WCD may define remaining transmissions of the sequence after the WCD has already engaged in one or more transmissions of the sequence.

The act of the WCD defining the sequence to include access probe transmissions to particular coverage areas may involve the WCD programmatically determining that the sequence should include particular access probe transmissions to particular coverage areas. For instance, if the sequence is to be six transmissions, the WCD may determine that four of the transmissions should be to a particular coverage area, that one of the transmissions should be to another coverage area, and the remaining transmission should be to yet another coverage area. The WCD may then proceed with access probe transmissions in accordance with the determined sequence, engaging in the transmissions until the WCD reaches the end of the sequence or until the WCD receives an acknowledgement from the RAN.

In practice, where the WCD defines the sequence to include at least one access probe transmission to a coverage area that the WCD deems to not be the strongest and also at least one access probe transmission to a coverage area that the WCD deems to be the strongest, the WCD may allocate the transmissions of the sequence among at least those coverage areas based on the relative detected strength of those coverage areas. For instance, if the WCD determines that coverage area A is approximately twice as strong as coverage area B, then the WCD may define the sequence to include twice as many access probe transmissions to coverage area A as access probe transmissions to coverage area B. Similarly, if the WCD determines that coverage area A is approximately three times as strong as coverage area B, then the WCD may define the sequence to include three times as many access probe transmissions to coverage area A as access probe transmissions to coverage area B.

To facilitate this, the WCD may programmatically determine strengths of various coverage areas and rank the coverage areas in order of their determined strengths, from strongest down to weakest. The WCD may then select a certain number of the top ranked coverage areas, such as the top two or three, and the WCD may allocate the transmissions of the sequence among those selected coverage areas based on their relative strengths.

Furthermore, the WCD may define the access probe transmission sequence, or sub-portions of the sequence, to begin with one or more transmissions to the coverage area that the WCD deems to be the strongest and to thereafter include one or more transmissions to a coverage area that the WCD deems to not be the strongest. And the WCD may define the sequence to cycle through such transmissions, perhaps first providing for one or more transmissions to coverage area deemed to be strongest, then provide for one or more transmissions to a coverage area deemed to not be strongest, then again providing for one or more transmissions to the coverage area deemed to be strongest, and again providing for one or more transmissions to the coverage area deemed to not be strongest.

As a specific example of this, consider a scenario where the RAN defines the access probe transmission sequence to be nine transmissions, where the WCD repeats that sequence twice, for a total of twenty seven access probe transmissions, and where the WCD is receiving twice the signal strength from coverage area A as from coverage area B. In that scenario, as noted above, the WCD might send two access probes to coverage area A for every one access probe it sends to coverage area B. Thus, the WCD might define the sequence of twenty-seven access probes in one of the following ways:

AAB AAB AAB, AAB AAB AAB, AAB AAB AAB
AAA AAA BBB, AAA AAA BBB, AAA AAA BBB
AAA AAA AAA, AAA AAA AAA, BBB BBB BBB

In the first of these sequences, every group of three access probe transmissions begins with two transmissions to coverage area A and then includes one transmission to coverage area B. In the second of these sequences, every group of nine access probe transmissions begins with six transmissions to coverage area A and then includes three transmissions to coverage area B. And in the third of these sequences, the first eighteen transmissions of the sequence are to coverage area A and the remaining nine transmissions are to coverage area B. Other examples are of course possible as well.

Figure 2:
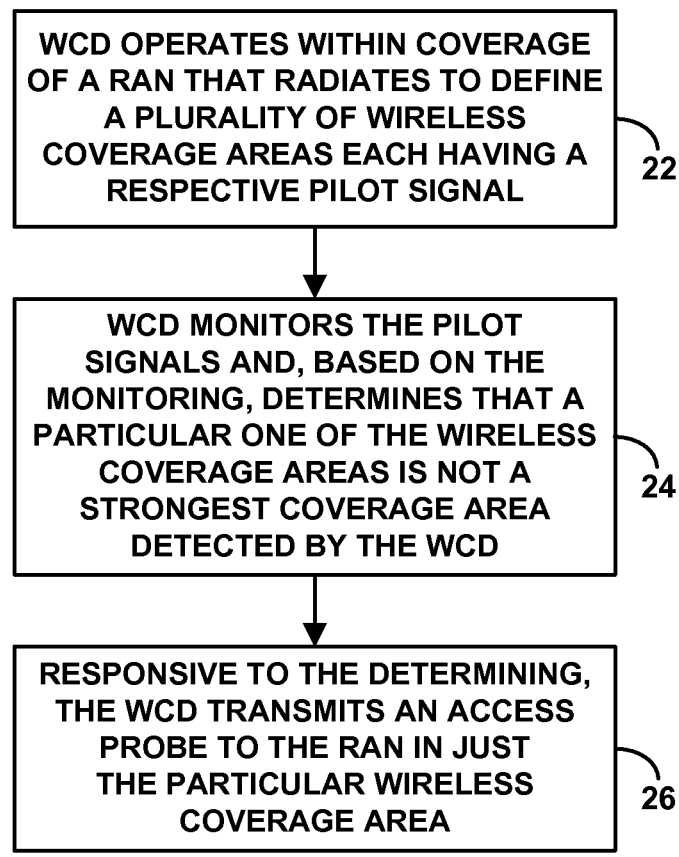
FIG. 2 is a flow chart depicting functions that can be carried out in accordance with an example method.

FIG. 2 is next a flow chart depicting functions that can be carried out in accordance with the present method. As shown in FIG. 2, at block 22, the method includes a WCD operating within coverage of a RAN that radiates to define a plurality of wireless coverage areas each having a respective pilot signal. At block 24, the method then involves the WCD monitoring the pilot signals and, based on the monitoring, determining that a particular one of the wireless coverage areas is not a strongest coverage area detected by the WCD. And at block 26, the method involves, responsive to the determining, the WCD transmitting an access probe to the RAN in just the particular wireless coverage area.

In the arrangement of FIG. 1, for instance, WCD 20 may idle within one of the illustrated coverage areas and may monitor pilot signals from each of the coverage areas, determining for each pilot signal a signal-to-noise ratio as a representation of coverage area strength. Thus, the WCD may receive and evaluate the pilot signal from each coverage area to determine its signal-to-noise ratio and may record an indication of that determined signal-to-noise ratio as an indication of strength of the coverage area as detected by the WCD. Based on those determined strengths of the coverage areas, the WCD may then determine that a particular one of the coverage areas is not the strongest, i.e., that another coverage area has a stronger pilot signal. And in response, the WCD may then transmit an access probe to just that particular coverage area.

In practice, the access probe may carry data such as a request for the RAN to establish a connection for the WCD and/or a response to a page message that the RAN had transmitted to the WCD. Further, the access probe to the particular coverage area may be one of a number of access probes that the WCD transmits to the RAN in an access probe transmission sequence until the WCD reaches the end of the sequence or receives an acknowledgement from the RAN.

Figure 3:
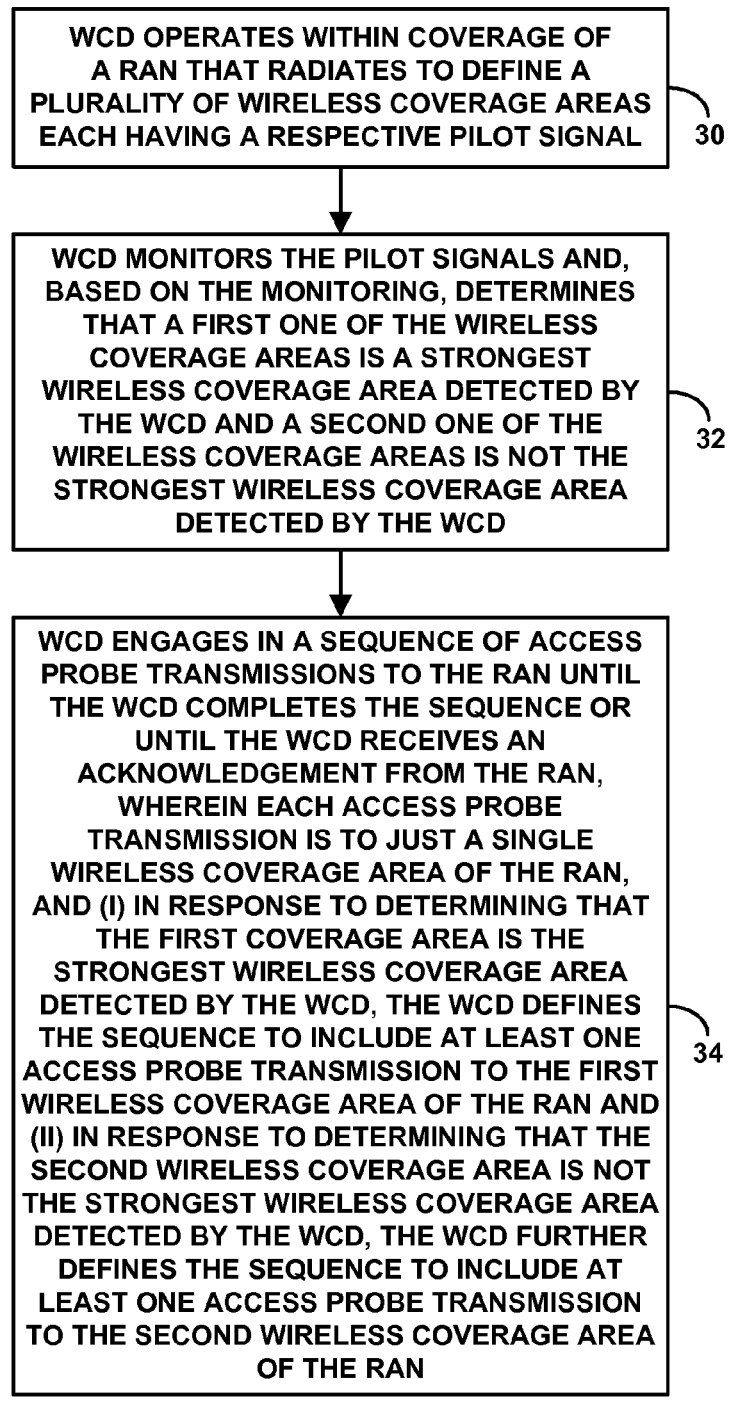
FIG. 3 is another flow chart depicting functions that can be carried out in accordance with an example method.

FIG. 3 is next another flow chart depicting functions that can be carried out in accordance with the present method. As shown in FIG. 3, at block 30, the method includes a WCD operating within coverage of a RAN that radiates to define a plurality of wireless coverage areas each having a respective pilot signal. At block 32, the method then involves the WCD monitoring the pilot signals and, based on the monitoring, determining that a first one of the wireless coverage areas is a strongest wireless coverage area detected by the WCD and a second one of the wireless coverage areas is not the strongest wireless coverage area detected by the WCD.

At block 34, the method then involves the WCD engaging in a sequence of access probe transmissions to the RAN until the WCD completes the sequence or until the WCD receives an acknowledgement from the RAN, wherein each access probe transmission is to just a single wireless coverage area of the RAN, and wherein (i) in response to determining that the first coverage area is the strongest wireless coverage area detected by the WCD, the WCD defines the sequence to include at least one access probe transmission to the first wireless coverage area of the RAN and (ii) in response to determining that the second wireless coverage area is not the strongest wireless coverage area detected by the WCD, the WCD further defines the sequence to include at least one access probe transmission to the second wireless coverage area of the RAN.

In practice, as noted above, the WCD may define this sequence of transmissions in this manner before the WCD engages in the sequence of transmissions. And the access probe transmissions of the sequence may occur on one or more uplink access channels of the RAN and may request the RAN to establish a connection (such as a voice call, data connection, radio connection over which to carry bearer data between the WCD and the RAN) and/or may respond to a page message that the RAN transmitted to the WCD.

Further, responsive to determining that the first wireless coverage area is the strongest wireless coverage area detected by the WCD and the second wireless coverage area is not the strongest wireless coverage area detected by the WCD, the WCD may define the sequence to include a greater number of access probe transmissions to the first wireless coverage area than to the second wireless coverage area.

More particularly, the WCD may determine an extent to which pilot strength of the first wireless coverage area detected by the WCD is stronger than pilot strength of the second wireless coverage area detected by the WCD, and the WCD may use the determined extent as a basis to allocate access probe transmissions of the sequence between at least the first wireless coverage area and the second wireless coverage area, such as to include a greater number of access probe transmissions to the first wireless coverage area than to the second wireless coverage area.

Still further, in line with the discussion above, the act of monitoring the pilot signals may involve determining for each pilot signal a signal-to-noise ratio as a representation of coverage area strength. And the method may further involve the WCD receiving wirelessly from the RAN a broadcast message specifying the wireless coverage areas of the RAN, in which case monitoring the pilot signals may involve (i) reading the broadcast message to determine the specified wireless coverage areas and (ii) monitoring the pilot signals of the determined wireless coverage areas.

Figure 4:
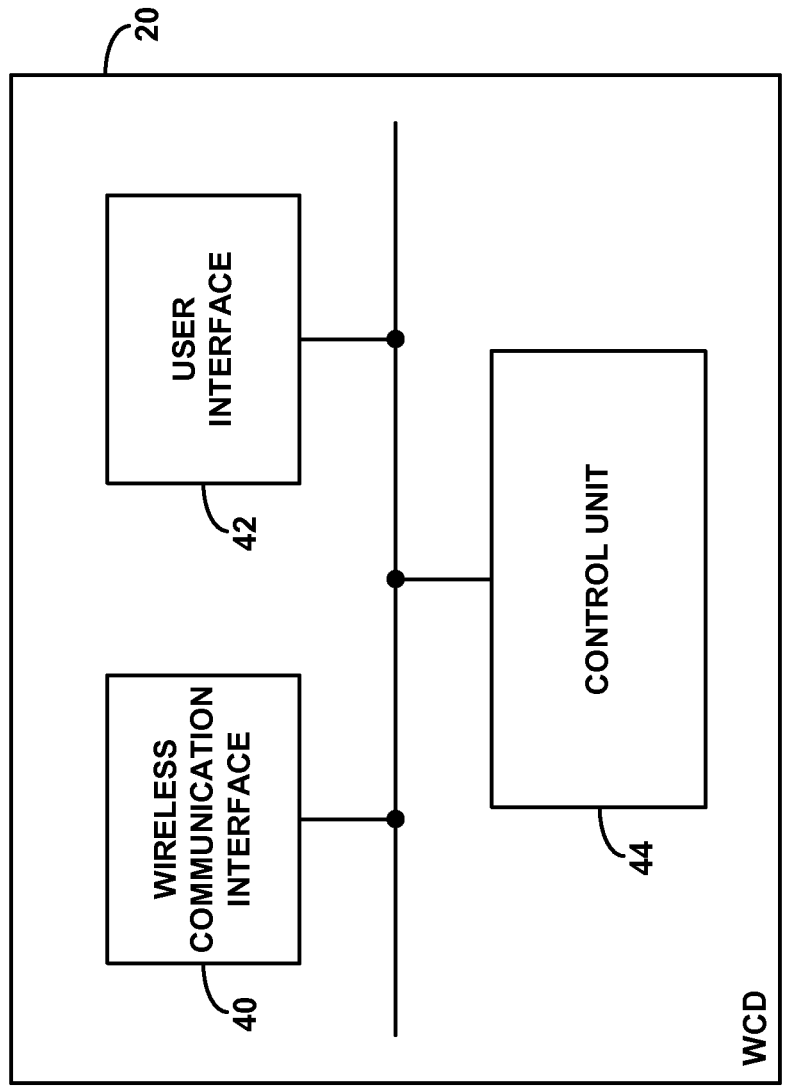
FIG. 4 is a simplified block diagram of a WCD arranged to implement an example method.

FIG. 4 is next a simplified block diagram of a WCD arranged to implement the present method. As shown in FIG. 4, the WCD includes a wireless communication interface 40, a user interface 42, and a control unit 44, all of which may be communicatively linked together by a system bus network, or other connection mechanism 46.

The wireless communication interface 40 may include an antenna structure and associated components (e.g., a mobile station modem chipset) for engaging in wireless communication with a RAN that radiates to define a plurality of wireless coverage areas each having a respective pilot signal. As such, the wireless communication interface may comprise an integrated circuit that is arranged with logic compliant with an applicable air interface protocol such as one of those noted above for instance.

The user interface 42, if applicable, may then comprise various input components, such as a touch sensitive surface, a microphone, a camera, and a keypad, for receiving user input, and output components, such as a display screen and a speaker, for providing output to a user. Further, the user interface may include analog-to-digital circuitry for converting between analog input/output exchanged with a user and digital input/output for processing by the WCD.

The control unit 44 may then be configured to carry out various functions described herein, such as (i) to monitor the pilot signals and, based on the monitoring, make a determination that a particular one of the coverage areas is not a strongest coverage area detected by the WCD and (ii) to define a sequence of access probe transmissions based on the monitoring, including in the sequence at least one access probe transmission to just the particular coverage area in response to the determination being that particular coverage area is not the strongest coverage area detected by the WCD. And the wireless communication interface 40 may be configured to transmit access probes to the RAN in accordance with the defined sequence, under direction of the control unit for instance.

As such, the control unit 44 may be integrated with the wireless communication interface 40. For instance, logic on a wireless communication interface chipset may be arranged to carry out the functions of the control unit. In that or other arrangements, the control unit may comprise a processing unit programmed with instructions to carry out the monitoring and the defining. For instance, the control unit may comprise one or more general-purpose processors (e.g., microprocessors) and/or one or more special-purpose processors (e.g., application specific integrated circuits), non-transitory data storage, and program instructions stored in or encoded on the data storage and executable by the processor(s) to carry out various described functions.

Exemplary embodiments have been described above. Those skilled in the art will understand, however, that changes and modifications may be made to these embodiments without departing from the true scope and spirit of the invention.

We claim:

1. A method comprising:

a wireless communication device (WCD) operating within coverage of a radio access network (RAN), wherein the RAN radiates to define a plurality of wireless coverage areas each having a respective pilot signal;

the WCD monitoring the pilot signals and, based on the monitoring, determining that a first one of the wireless coverage areas is a strongest wireless coverage area detected by the WCD and a second one of the wireless coverage areas is not the strongest wireless coverage area detected by the WCD; and the WCD engaging in a sequence of access probe transmissions to the RAN until the WCD completes the sequence or until the WCD receives an acknowledgement from the RAN, wherein each access probe transmission is to just a single wireless coverage area of the RAN, and wherein (i) in response to determining that the first coverage area is the strongest wireless coverage area detected by the WCD, the WCD defines the sequence to include at least one access probe transmission to the first wireless coverage area of the RAN and (ii) in response to determining that the second wireless coverage area is not the strongest wireless coverage area detected by the WCD, the WCD further defines the sequence to include at least one access probe transmission to the second wireless coverage area of the RAN.

2. The method of claim 1, further comprising:

before engaging in the sequence of access probe transmissions to the RAN, the WCD defining the sequence to include the at least one access probe transmission to the first wireless coverage area and the at least one access probe transmission to the second wireless coverage area.

3. The method of claim 2, responsive to determining that the first wireless coverage area is the strongest wireless coverage area detected by the WCD and the second wireless coverage area is not the strongest wireless coverage area detected by the WCD, the WCD defining the sequence to include a greater number of access probe transmissions to the first wireless coverage area than to the second wireless coverage area.

4. The method of claim 2, further comprising:

the WCD determining an extent to which pilot strength of the first wireless coverage area detected by the WCD is stronger than pilot strength of the second wireless coverage area detected by the WCD; and the WCD using the determined extent as a basis to allocate access probe transmissions of the sequence between at least the first wireless coverage area and the second wireless coverage area.

5. The method of claim 4, wherein using the determined extent as a basis to allocate access probe transmission attempts of the sequence between at least the first wireless coverage area and the second wireless coverage area comprises defining the sequence to include a greater number of access probe transmissions to the first wireless coverage area than to the second wireless coverage area.

6. The method of claim 1, wherein the access probe transmissions of the sequence request the RAN to establish a connection for the WCD.

7. The method of claim 6, wherein the connection comprises a connection selected from the group consisting of (i) a voice call, (ii) a data connection, and (iii) a radio connection over which to carry bearer data between the WCD and the RAN.

8. The method of claim 1, wherein the access probe transmissions of the sequence respond to a page message that the RAN transmitted to the WCD.

9. The method of claim 1, wherein monitoring the pilot signals comprises determining for each pilot signal a signal-to-noise ratio as a representation of coverage area strength.

10. The method of claim 1, further comprising the WCD receiving wirelessly from the RAN a broadcast message specifying the wireless coverage areas of the RAN, wherein monitoring the pilot signals comprises (i) reading the broadcast message to determine the specified wireless coverage areas and (ii) monitoring the pilot signals of the determined wireless coverage areas.

* * * * *